United States Patent [19]
Curtis

[11] Patent Number: 4,901,952
[45] Date of Patent: Feb. 20, 1990

[54] CONTROL APPARATUS

[75] Inventor: Neil J. Curtis, Kingston-upon-Thames, England

[73] Assignee: British Aerospace Public Limited Company, London, England

[21] Appl. No.: 220,933

[22] Filed: Jun. 23, 1988

Related U.S. Application Data

[63] Continuation of Ser. No. 42,749, Apr. 27, 1987, abandoned.

[30] Foreign Application Priority Data

Apr. 29, 1986 [GB] United Kingdom ............... 8610481

[51] Int. Cl.$^4$ ............................................. B64C 13/04
[52] U.S. Cl. .............................. 244/234; 244/23 D; 74/471 XY
[58] Field of Search ............... 244/234, 229, 237, 230, 244/235, 236, 12.5, 23 D, 56; 74/471 XY, 471 R, 491

[56] References Cited

U.S. PATENT DOCUMENTS

| | | | |
|---|---|---|---|
| 2,787,746 | 4/1957 | Redmond | 74/491 |
| 2,923,502 | 2/1960 | Rossire | 244/234 |
| 3,098,628 | 7/1963 | Chaplin | 244/234 |
| 3,599,510 | 8/1971 | Scott | 244/234 |
| 3,726,497 | 4/1973 | Gannett et al. | 244/234 |
| 4,130,259 | 12/1978 | Carlson et al. | 244/234 |
| 4,134,560 | 11/1979 | Messerschmidt | 244/234 |
| 4,280,371 | 7/1981 | Kobelt | 74/491 |
| 4,567,786 | 2/1986 | Sakurai | 74/491 |
| 4,574,651 | 3/1986 | Nordström | 244/234 |
| 4,667,909 | 5/1987 | Curci | 244/234 |

Primary Examiner—Galen Barefoot
Attorney, Agent, or Firm—Cushman, Darby & Cushman

[57] ABSTRACT

Control apparatus for effecting control of thrust magnitude and thrust vector angle for aircraft of the short take-off and vertical landing type known by the acronym STOVL comprises a fixed housing (10), a manually movable stick member (7) supported with respect to the fixed housing (10) and arranged to provide a throttle input, the stick member (7) including a grip (8) to enable it to be gripped and moved manually relative to the fixed housing (10), and a rotatable collar (9) arranged to provide the thrust vector angle input. Preferably the grip includes an upright hand-datum flange (13) for positively laterally locating a controlling hand and the hand-datum flange (13) is located at one extremity of the grip (8) and the collar (9) is located at the other extremity of the grip (8).

16 Claims, 4 Drawing Sheets

CONTROL APPARATUS

This is a continuation of application Ser. No. 07/042,749, filed Apr. 27, 1987, which was abandoned upon the filing hereof.

BACKGROUND OF THE INVENTION

This invention relates to control apparatus for aircraft and more particularly to such apparatus for effecting control of thrust magnitude and thrust vector angle for aircraft of the short take-off and vertical landing type known by the acronym STOVL.

Aircraft of this type are known in which the power unit, in addition to providing propulsive thrust for the conventional flight mode is arranged so that the thrust is 'vectored' at selectively variable angles to the horizontal to give a short take-off and landing facility or to enable the aircraft to land or take-off substantially vertically, to hover and, in certain circumstances, to give a supplementary in-flight maneuvering capability.

It is also known to provide aircraft with a control system in which various parts of the aerodynamic control surfaces of the aircraft are moved by actuators controlled by means of control signals generated by movement of a controller, which may be a force stick or one pivotally mounted on the aircraft structure for example to one side of the aircraft cockpit. This is a two-axis input device controlling pitch and lateral responses of the aircraft with both similar flight-critical control inputs controlled from a single hand controller.

In achieving a STOVL capability, two flight critical dissimilar inputs are involved, throttle input controlling thrust magnitude, and nozzle input controlling thrust vector angles. In known aircraft having such STOVL capability separate throttle and nozzle levers are employed requiring at least two quite distinct pilot actions. Recent developments in active control systems have permitted the replacement of mechanical control links, previously used on such throttle and nozzle input arrangements, with electrical or optical sensors and signalling.

SUMMARY OF THE INVENTION

According to this invention a control apparatus for an aircraft arranged to produce signals in response to control movements, includes a fixed housing, a manually movable stick member supported with respect to the fixed housing and arranged to provide a first control input, the stick member including a grip to enable it to be gripped and moved manually relative to the fixed housing, and a rotatable collar arranged to provide a second control input.

Preferably the control apparatus is for a STOVL aircraft and is arranged to produce signals corresponding to thrust magnitude demand and thrust vector angle demand in response to control demand signals, the thrust magnitude demand input being provided by the location of the stick member with respect to the fixed housing, and the thrust vector angle demand input being provided by the angular orientation of the collar. Preferably the grip includes an upright hand-datum flange for positively laterally locating a controlling hand with respect to the rotatable collar. In this case, the hand-datum flange is preferably located at one extremity of the grip and the collar is preferably located at the other extremity of the grip.

Preferably the attitude of the manually movable stick member remains substantially constant throughout its range of movement. Preferably the collar includes a manually releasable friction lock which increases the friction existing between the collar and the grip to prevent inadvertent operation of the collar. With two flight critical dissimilar inputs it is important that potential cross-coupling between throttle inputs and nozzle inputs is eliminated. By arranging for the attitude of the stick member to remain constant throughout its range of movement there is no change in angular orientation of the collar solely as a result of the movement of the stick member. The collar, located at one end of the grip and having a relatively short axial extent enables the pilot to hold the grip and actuate the stick member without engaging the collar. The provision of the hand-datum flange also facilitates the location of the pilot's hand only on the grip or also engaging the collar. The rotary movement required to rotate the collar has no component tending to move the stick member linearly and, once the friction lock has been released only a small torque is required to cause the angular rotation of the collar and thus, this action is unlikely to cause movement of the stick member.

Preferably the control apparatus also includes a selectable stop mechanism to selectively limit the range of angular movement of the collar. This enables the collar to be moved rapidly and readily between an end of its travel and a preselected stop location and thus, for example, enables the collar to move rapidly from a nozzles fully aft position to an intermediate location so that, during a short take-off the pilot can initially set the nozzles in a fully aft position and then, once a predetermined speed has been reached, easily rotate the collar to select the predetermined intermediate position to induce take-off.

BRIEF DESCRIPTION OF THE DRAWINGS

A particular example of a control apparatus in accordance with this invention will now be described with reference to the accompanying drawings in which.

DESCRIPTION OF PREFFERED EXAMPLE

Figure 1:
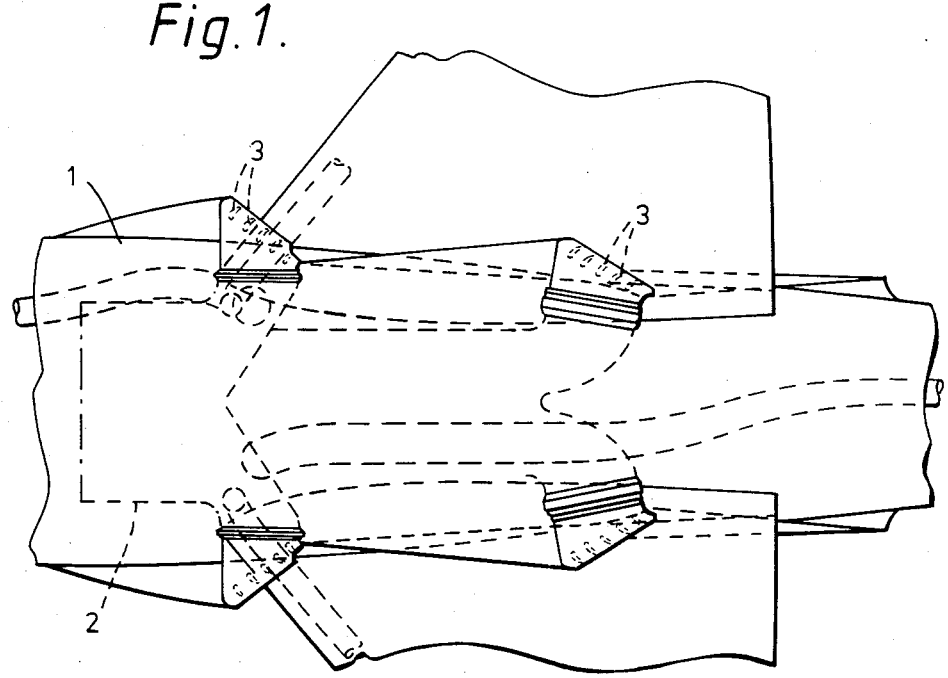
FIG. 1 is a partial plan view of a STOVL aircraft.
Figure 2:
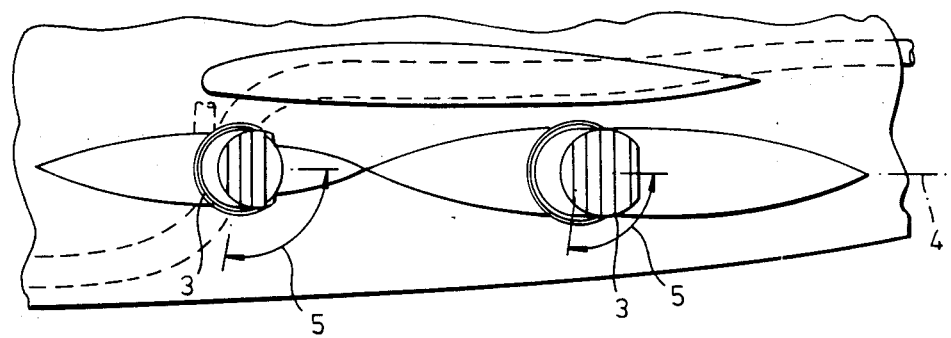
FIG. 2 is a partial side elevation of the aircraft shown in FIG. 1.
Figure 3:
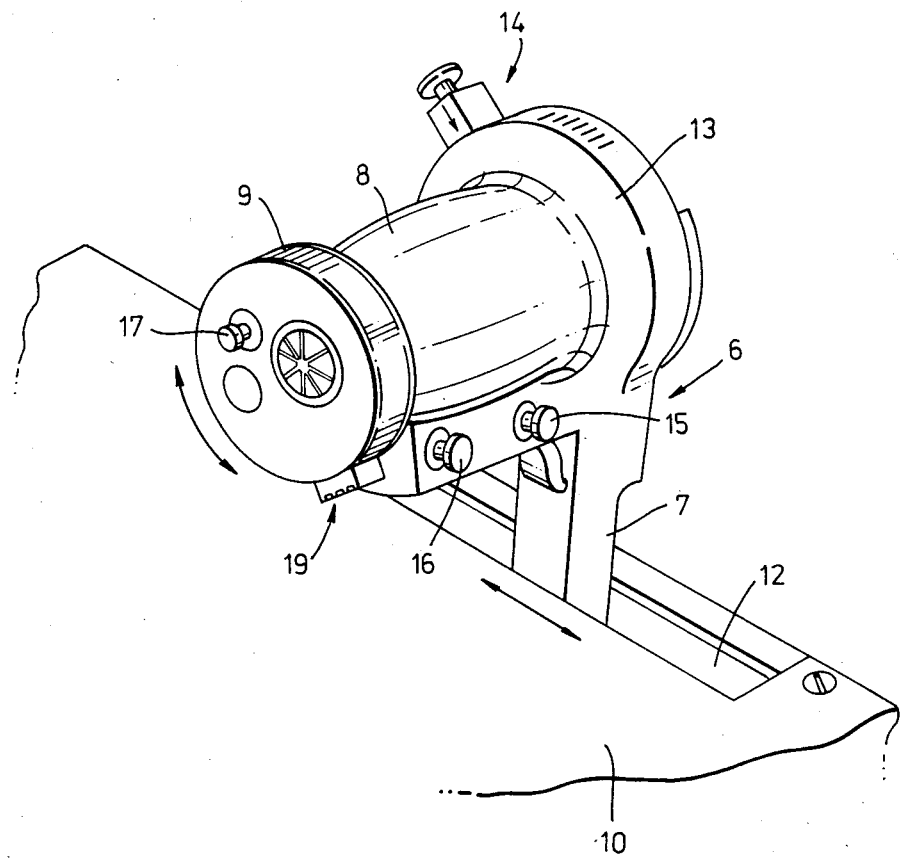
FIG. 3 is a perspective view from ahead inboard and above of the control apparatus.
Figure 4:
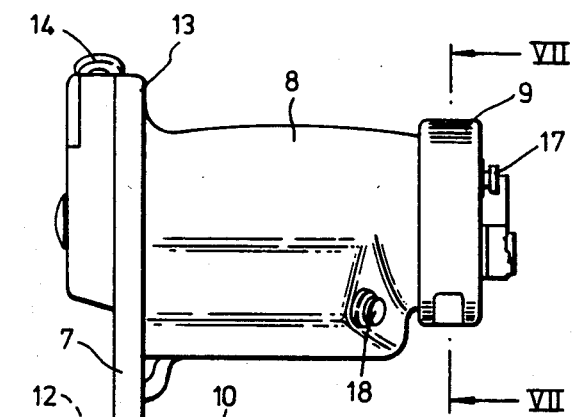
FIG. 4 is a rear elevation of the control apparatus.
Figure 5:
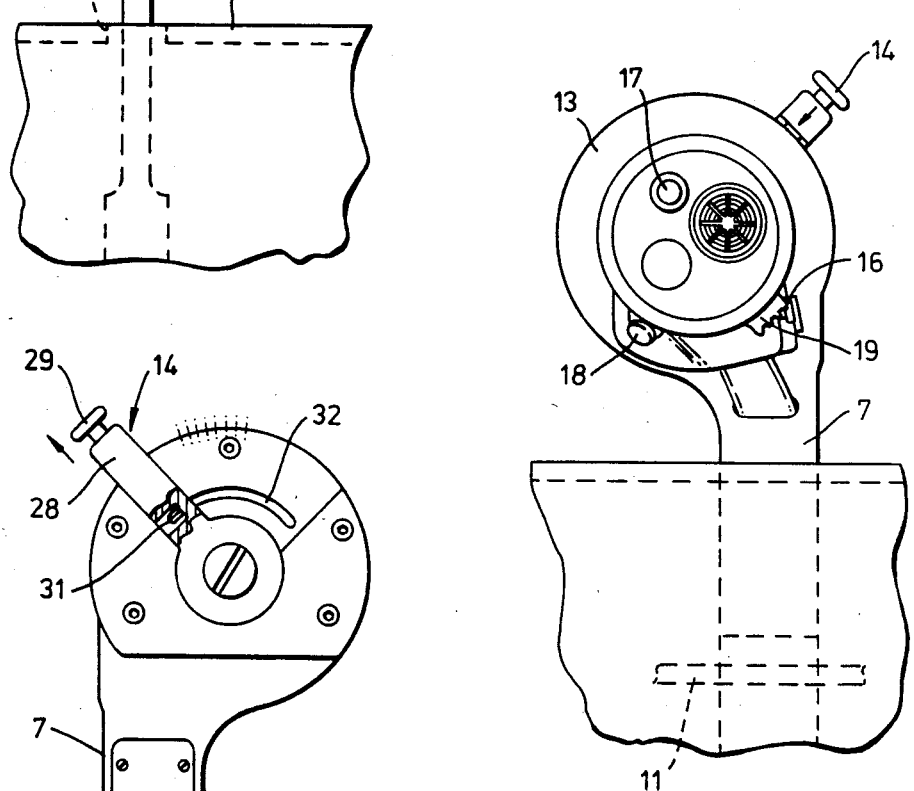
FIG. 5 is an elevation of the inboard side of the control apparatus.

FIGS. 1 and 2 illustrate a wellknown vertical take-off and landing aircraft having a fuselage 1 housing a gas turbine propulsion engine 2 which supplies vector thrust nozzles 3. In the arrangement shown the nozzles 3 are in their attitude for a conventional forward flight and thus face rearwardly along a horizontal datum 4. As shown in FIG. 2 the nozzles are movable from the rearward position over a range of nozzle rotation angles depending upon the selected flight mode.

The nozzles 3 are controlled by a control apparatus 6 which includes a slide stick controller 7 having a hand grip 8 and a rotatable collar 9. The control apparatus is located on the lefthand side of the cockpit of the aircraft. Forwards and rearwards movement of the slide stick controller 7 controls the throttle and rotation of the collar 9 controls the angle of the nozzles 3. These two inputs are both flight-safety critical and are dissimilar but actuation of the one controller 6 does enable either to be varied independently or both simultaneously. The directions of movement of the control apparatus are compatible with the controlled variables, the forward and backward movement of the slide stick 7 being used to control the throttle and hence the forward velocity of the aircraft whereas the angular rotation of the collar 9 controls the angular orientation of the nozzles 3.

A throttle mounting structure 10 includes a linear throttle control 11 formed by a number of gauged potentiometers. The slide stick controller 7 is attached to a linear slideway and extends upwards through a slot 12 formed in the throttle mounting structure 10. A vertical hand-datum flange 13 provides a positive lateral location of the outside edge of the lefthand of a pilot gripping the hand grip 8. The hand-datum flange 13 includes a nozzle stop selector mechanism 14 which will be described in detail subsequently and a number of ancillary mission related switches 15, 16, 17 and 18 are also provided around the hand grip 8.

In operation, changes of thrust magnitude are effected by manually moving the controller 7 in a forward or rearward direction corresponding to increases or decreases in thrust output, respectively. Simultaneously, the pilot may, while still maintaining his grip on the grip 8 effect changes of thrust vector angles by rotation of the collar 9 in a clockwise or anticlockwise direction. The collar is conveniently rotated by being gripped between the pilot's forefinger and thumb. A strictly linear forwards and backwards movement of the slide stick 7 is preferred to the more familiar quadrant type of throttle control to eliminate potential cross-coupling effects and inadvertent operation of the thrust vector angle. A conventional quadrant type throttle control would give an effective relative rotation between the grip 8 in the pilot's hand and hence between the collar 9 and the pilot's hand which could result in inadvertent rotation of the collar 9.

Figure 7:
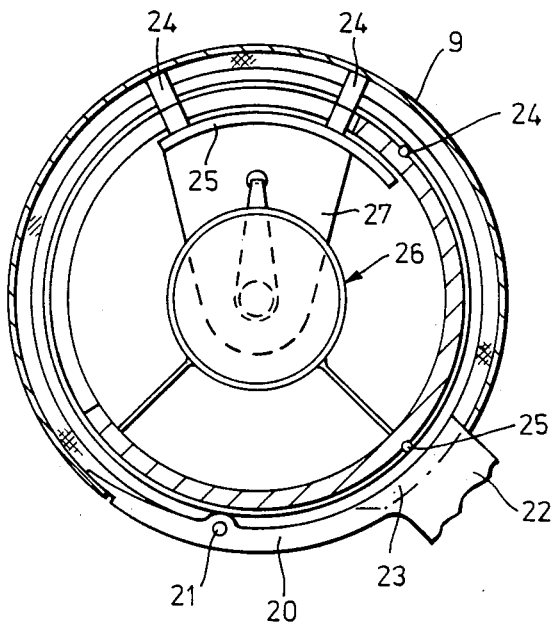
FIG. 7 is a section through the collar taken on the lines VII—VII shown in FIG. 4 but drawn to a larger scale.

The collar 9 includes a friction lock mechanism 19 which increases the friction between the collar 9 and the grip 8 to help prevent inadvertent operation of the collar 9. The friction lock mechanism is shown more clearly in FIG. 7 and comprises a spring steel friction lock lever 20 which is pivotally connected by a pin 21 to the collar 9. An actuating button 22 is located at one end of the lever and the other end of the lever is cantilevered to engage the collar 9. A friction surface 23 adjacent the actuating button 22 engages with a mating surface on the inside of a bearing of the collar 9 and significantly increases the break out torque required to rotate the collar. However, when the pilot grips the collar 9 between his thumb and forefinger his forefinger engages the button 22 and moves it radially inwards against the bias of the spring lever 20 to release the friction surfaces and so allow the collar 9 to rotate freely. The actuating button 22 also provides a tactile indication to the pilot of the angular orientation of the collar 9 and hence of the nozzles 3.

Figure 8:
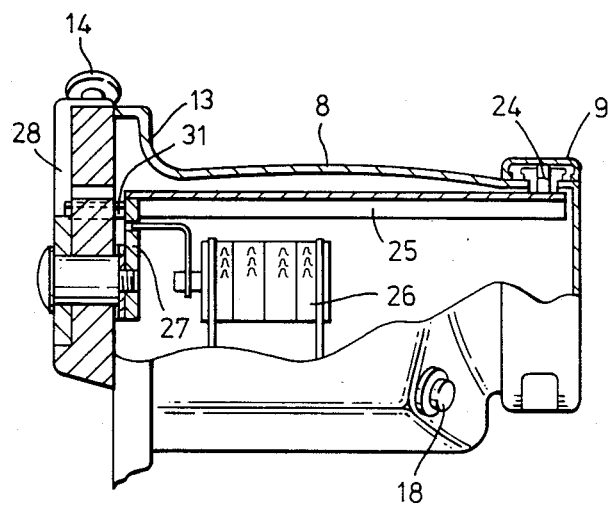
FIG. 8 is a longitudinal section through the grip drawn to a larger scale.

Ball bearings 24 and 25 set into the face of a bearing ring engage a hole in the inner surface of the collar 9 at two discreet positions of the collar 9. This provides a pair of detents corresponding respectively to engine exhaust nozzles fully aft and nozzles in the position for hovering and provides an indexing mechanism to enable the pilot to feel these locations. The collar 9 is attached via pins 24 to a transfer plate 25 extending to inside the hand grip 8 as shown in FIG. 8 and arranged to transfer the angular movement of the collar 9 to angular movement of wipers of a gang of four rotary potentiometers 26 via a quadrant 27.

Figure 6:
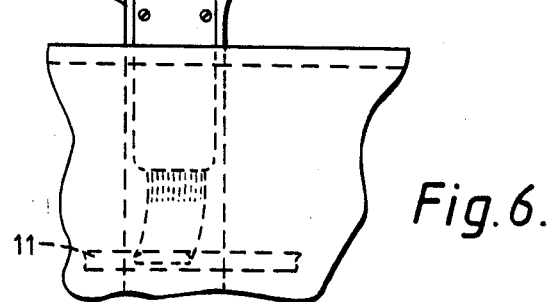
FIG. 6 is the elevation of the outboard side of the control apparatus.
Figure 9:
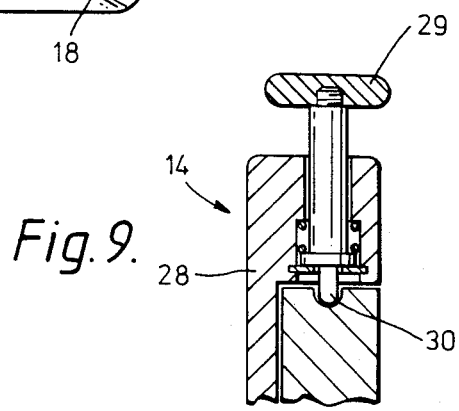
FIG. 9 is a section drawn to a larger scale through the stop selector mechanism.

The nozzle stop selector mechanism 14 is shown most clearly in FIGS. 6 and 9 and comprises a pivotted radial arm 28 having a spring loaded plunger 29 biased into its radially innermost position. An end 30 of the spring loaded plunger 29 is rounded and is arranged to engage in a number of detents provided at 5° intervals around the upper surface of the hand datum flange 13. A projection 31 extends outwards from the quadrant 27 through a slot 32 in the hand datum flange 13. The projection 31 engages the radial arm 28 as best seen in FIG. 6 and thus, by setting the radial arm 28 in a preselected position by lifting the spring loaded plunger 29 and locating its end 30 in a required detent, movement of the collar 9 is caged by the projection 31 being limited to movement between the forward end of the slot 32 and the forward end of the radial arm 28. For a full range of movement of the control nozzles the radial arm 28 should be to the rear most position.

I claim:

1. A control apparatus for an aircraft of the vectored thrust type arranged to produce control signals in response to control movements, including:
    a fixed housing;
    a manually movable stick member supported with respect to said fixed housing and arranged to provide a first control signal corresponding to thrust magnitude demand, said thrust magnitude demand being determined by the location of said stick member with respect to said housing;
    said stick member including a grip to enable it to be gripped and moved manually with respect to said fixed housing so as to vary said thrust magnitude demand; and
    a rotatable collar mounted on said grip and arranged to provide a second control signal corresponding to thrust vector angle demand, said thrust vector angle demand being determined by an angular orientation of said collar.

2. A control apparatus according to claim 1, in which said grip includes an upright hand-datum flange for positively laterally locating a controlling hand with respect to said rotatable collar.

3. A control apparatus according to claim 2, in which said hand-datum flange is located at one extremity of said grip and said collar is located at the other extremity of said grip.

4. A control apparatus according to claim 1, in which the attitude of said manually movable stick member, with respect to a pilot, remains substantially constant throughout its range of movement.

5. A control apparatus according to claim 1, in which said collar includes a manually releasable friction lock.

6. A control apparatus according to claim 4, in which said collar includes a manually releasable friction lock.

7. A control apparatus according to claim 1, in which said control apparatus also includes a selectable stop mechanism selectively to limit the range of angular movement of said collar.

8. A control apparatus according to claim 1, in which said collar includes a number of preset angular detents at locations corresponding to predetermined angular orientations.

9. A control apparatus according to claim 1, which also includes ancillary control switches.

10. A control apparatus for a vectored thrust aircraft arranged to produce a thrust magnitude demand signal and a thrust vector angle demand signal in response to control movements, said apparatus including:
- a fixed housing;
- a manually movable stick member supported with respect to said fixed housing, the attitude of said manually movable stick member remaining substantially constant with respect to a pilot throughout its range of movement, said thrust magnitude demand signal being provided by the location of said stick member with respect to said fixed housing;
- said stick member including a grip to enable it to be gripped and moved manually relative to said fixed housing;
- a rotatable collar mounted on said grip, said thrust vector angle demand signal being provided by the angular orientation of said collar; and
- an upright hand-datum flange located on said grip for positively laterally locating a controlling hand with respect to said rotatable collar, said hand-datum flange being located at one extremity of said grip and said collar being located at the other extremity of said grip.

11. A control apparatus according to claim 10, in which said collar includes a manually releasable friction lock.

12. A control apparatus according to claim 10, in which said control apparatus also includes a selectable stop mechanism selectively to limit the range of angular movement of said collar.

13. A control apparatus according to claim 11, in which said control apparatus also includes a selectable stop mechanism selectively to limit the range of angular movement of said collar.

14. A control apparatus according to claim 10, in which said collar includes a number of preset angular detents at locations corresponding to predetermined angular orientations.

15. A control apparatus according to claim 12, in which said collar includes a number of preset angular detents at locations corresponding to predetermined angular orientations.

16. A control apparatus according to claim 10, which also includes ancillary control switches.

* * * * *